(12) United States Patent
Weikel et al.

(10) Patent No.: US 9,434,866 B2
(45) Date of Patent: Sep. 6, 2016

(54) ADHESIVES COMPRISING EPOXY-ACID CROSSLINKED GROUPS AND METHODS

(71) Applicant: 3M INNOVATIVE PROPERTIES COMPANY, St. Paul, MN (US)

(72) Inventors: Arlin L. Weikel, Roberts, WI (US); Babu N. Gaddam, Woodbury, MN (US); Larry R. Krepski, White Bear Lake, MN (US); Wayne S. Mahoney, St. Paul, MN (US); Jason D. Clapper, Lino Lakes, MN (US)

( * ) Notice: Subject to any disclaimer, the term of this patent is extended or adjusted under 35 U.S.C. 154(b) by 117 days.

(21) Appl. No.: 14/194,840

(22) Filed: Mar. 3, 2014

(65) Prior Publication Data

US 2014/0272407 A1  Sep. 18, 2014

Related U.S. Application Data

(60) Provisional application No. 61/778,838, filed on Mar. 13, 2013.

(51) Int. Cl.
| | | |
|---|---|---|
| *C09J 163/00* | (2006.01) | |
| *C09J 133/06* | (2006.01) | |
| *C08L 33/06* | (2006.01) | |
| *C09J 133/08* | (2006.01) | |
| *C09J 7/02* | (2006.01) | |

(52) U.S. Cl.
CPC ............ *C09J 133/08* (2013.01); *C09J 7/0217* (2013.01); *C09J 133/068* (2013.01); *C08L 2312/00* (2013.01); *Y10T 428/2809* (2015.01)

(58) Field of Classification Search
None
See application file for complete search history.

(56) References Cited

U.S. PATENT DOCUMENTS

| | | |
|---|---|---|
| 3,018,262 A | 1/1962 | Schroeder |
| 3,117,099 A | 1/1964 | Proops |
| 3,284,423 A | 11/1966 | Knapp |
| 3,691,140 A | 9/1972 | Silver |
| 3,708,296 A | 1/1973 | Schlesinger |
| 4,069,055 A | 1/1978 | Crivello |
| 4,166,152 A | 8/1979 | Baker |
| 4,216,288 A | 8/1980 | Crivello |
| 4,250,311 A | 2/1981 | Crivello |
| 4,279,717 A | 7/1981 | Eckberg |
| 4,286,047 A | 8/1981 | Bennett |
| 4,619,979 A | 10/1986 | Kotnour |
| 4,636,432 A | 1/1987 | Shibano |
| 4,656,218 A | 4/1987 | Kinoshita |
| 4,751,138 A | 6/1988 | Tumey |
| 4,843,134 A | 6/1989 | Kotnour |
| 4,985,340 A | 1/1991 | Palazzotto |
| 5,045,569 A | 9/1991 | Delgado |
| 5,084,586 A | 1/1992 | Farooq |
| 5,086,088 A | 2/1992 | Kitano |
| 5,124,417 A | 6/1992 | Farooq |
| 5,399,604 A | 3/1995 | Sano |
| 5,506,279 A | 4/1996 | Babu |
| 5,554,664 A | 9/1996 | Lamanna |
| 5,637,646 A | 6/1997 | Ellis |
| 5,639,811 A | 6/1997 | Plamthottam |
| 5,723,191 A | 3/1998 | Plamthottam |
| 5,753,346 A | 5/1998 | Leir |
| 5,804,610 A | 9/1998 | Hamer |
| 5,902,836 A | 5/1999 | Bennett |
| 6,066,394 A | 5/2000 | Hoff |
| 6,130,269 A | 10/2000 | Hosokawa |
| 6,211,261 B1 | 4/2001 | Hosokawa |
| 6,335,143 B1 | 1/2002 | Sumino |
| 6,376,070 B1 | 4/2002 | Nakasuga |
| 6,790,310 B2 | 9/2004 | Nakasuga |
| 6,949,297 B2 | 9/2005 | Yang |
| 7,727,595 B2 | 6/2010 | Gordon |
| 8,785,517 B2 | 7/2014 | Weikel |
| 2007/0104972 A1 | 5/2007 | Shinohara |
| 2008/0023131 A1* | 1/2008 | Pressley .................... C08F 2/50 156/273.7 |
| 2009/0047441 A1 | 2/2009 | Gordon |
| 2013/0196152 A1 | 8/2013 | Mahoney |
| 2013/0196153 A1 | 8/2013 | Weikel |

FOREIGN PATENT DOCUMENTS

| | | |
|---|---|---|
| EP | 0887706 | 12/1998 |
| WO | WO 81/00309 | 2/1981 |

(Continued)

OTHER PUBLICATIONS

Blank et al., "Catalysis of the Epoxy-Carboxyl Reaction", published online in 2003 at http://www.wernerblank.com/pdfiles/paper23.pdf.*

(Continued)

*Primary Examiner* — Vu A Nguyen

(57) ABSTRACT

Adhesives compositions and methods of preparing adhesive compositions are described. The methods generally comprise a) providing a syrup composition comprising i) a free-radically polymerizable solvent monomer; and ii) a solute (meth)acrylic copolymer; and b) radiation curing the syrup composition in the absence of an ionic photoacid generator. In one embodiment, the solute (meth)acrylic copolymer as provided or during curing comprises repeat units derived from at least one alkyl(meth)acrylate monomer, at least one ethylenically unsaturated monomer comprising an acid-functional group; and at least one (meth)acryloyl monomer comprising an epoxy-functional group; and the acid-functional groups crosslink with the epoxy-functional groups. In another embodiment, the solute (meth)acrylic copolymer comprising repeat units derived from at least one alkyl(meth)acrylate monomer and at least one ethylenically unsaturated monomer comprising an acid-functional group; and an epoxy resin, having on average greater than one polymerizable epoxy group per molecule, crosslinks the acid-functional groups.

17 Claims, No Drawings

(56) References Cited

FOREIGN PATENT DOCUMENTS

| WO | WO 94/29358 | 12/1994 |
|---|---|---|
| WO | WO 2007/087399 | 8/2007 |
| WO | WO 2011/063070 | 5/2011 |
| WO | WO 2011/112643 | 9/2011 |
| WO | WO 2012/091817 | 7/2012 |
| WO | WO 2012/161997 | 11/2012 |
| WO | WO 2012/177337 | 12/2012 |

OTHER PUBLICATIONS

Czech et al., "UV-crosslinked acrylic pressure-sensitive adhesive systems containing unsaturated ethers," vol. 52, No. 6, pp. 438-442, 2007.
Yarbrough, et al., "Contact Angle Analysis, Surface Dynamics, and Biofouling Characteristics of Cross-Linkable, Random Perfluoropolyether-Based Graft Terpolymers," Macromolecules, vol. 39, pp. 2521-2528, 2006.
Crivello, et al., "The Effects of Polyols As Chain Transfer Agents and Flexibilizers in Photoinitiated Cationic Photopolymerization", Journal of Radiation Curing, pp. 3-9, Oct. 1986.
J. V. Cirvello et al., "Epoxidized Triglycerides as Renewable Monomers in Photoinitiated Cationic Polymerization", Chem. Mater. 4, 692-699 (1992).
Kirk-Othmer Encyclopedia of Chemical Technology, $4^{th}$ Edition, Supplement Volume, John Wiley and Sons, New York, pp. 253-255.
Steven L. Murov, Handbook of Photochemistry, Marcel Dekker Inc., N.Y., 27-35 (1973).
Montarnal et al., Silica-Like Malleable Materials from Permanent Organic Networks, sciencemag.org, vol. 334, Nov. 18, 2011, 965-968.
International Search Report PCT/US2014/019767; Sep. 1, 2014, 5 pages.
Koleske, Joseph V. (2002) Radiation Curing of Coatings p. 61. ASTM International. [Retrieved Online 20131020] retrieved from <URL:http://app.knovel.com/hotlink/toc/id:kpRCCMNL01/radiation-curing-coatings>.
Zhou et al., "The Development of Onium Salt Cationic Photoinitiators", Materials Review A: Review, 25(1), 16-21, Jan. 2011.

* cited by examiner

ADHESIVES COMPRISING EPOXY-ACID CROSSLINKED GROUPS AND METHODS

RELATED APPLICATION DATA

This application claims the benefit of U.S. Provisional Application Ser. No. 61/778,838, filed Mar. 13, 2013; incorporated herein by reference.

BACKGROUND

As described in WO 2012/177337, there are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines.

WO 2012/177337 (abstract) describes a pre-adhesive composition comprising an epoxy-functional (meth)acryloyl copolymer and epoxy resin, which when crosslinked using an ionic photoacid generator (PAG) provides a pressure-sensitive adhesive and pressure-sensitive adhesive articles having desirable properties.

WO2012/161997 (abstract) describes a pre-adhesive composition comprising an acid- and epoxy-functional (meth)acryloyl copolymer, which when crosslinked using an ionic photoacid generator (PAG) provides a pressure-sensitive adhesive and pressure-sensitive adhesive articles having desirable properties.

SUMMARY

It has been found that certain epoxy-functional groups and acid-functional groups of an adhesive composition readily crosslink in the absence of an ionic photoacid generator (PAG).

In some embodiments, methods of preparing an adhesive composition as described comprising providing a syrup composition comprising a free-radically polymerizable solvent monomer and a solute (meth)acrylic copolymer, and radiation curing the syrup composition in the absence of an ionic photoacid generator.

In one embodiment, the solute (meth)acrylic copolymer comprises repeat units derived from at least one alkyl(meth) acrylate monomer, at least one ethylenically unsaturated monomer comprising an acid-functional group; and at least one (meth)acryloyl monomer comprising an epoxy-functional group. Pendent acid-functional groups crosslink with the pendent epoxy functional groups.

In another embodiment, the (meth)acrylic copolymer comprising repeat units derived from at least one alkyl (meth)acrylate monomer, and at least one ethylenically unsaturated monomer comprising an acid-functional group. The syrup composition further comprises
an epoxy resin having on average greater than one polymerizable epoxy group per molecule. The epoxy resin crosslinks the acid-functional group.

Also described are adhesive compositions and adhesive articles, such as tapes. prepared by such methods.

DETAILED DESCRIPTION

The present disclosure describes adhesives prepared from crosslinkable (e.g., syrup) compositions, as well as articles.

In favored embodiments, the adhesive is a crosslinked pressure-sensitive adhesives that provides a suitable balance of tack, peel adhesion, and shear holding power, and further conforms to the Dahlquist criteria, i.e., the modulus of the adhesive at the application temperature, typically room temperature, is less than $3 \times 10^6$ dynes/cm at a frequency of 1 Hz.

"Syrup composition" refers to a solution of a solute (co)polymer in one or more solvent monomers, the composition having a viscosity of from 500 to 10,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom replaced by a catenary heteroatom such as O, S, or N or containing functional groups such as amide, ester, urea, urethane or ether functional groups.

The term "(hetero)hydrocarbyl" includes both hydrocarbyl and heterohydrocarbyl.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

When a group is present more than once in a formula described herein, each group is "independently" selected unless specified otherwise.

The present invention pertains to adhesive compositions wherein epoxy-functional groups and acid-functional groups are crosslinked in the absence of an ionic photoacid generator (PAG).

As described in WO 2012/177337, incorporated herein by reference; upon irradiation with light energy, ionic photoacid generators undergo a fragmentation reaction and release one or more molecules of Lewis or Brönsted acid that catalyze the ring opening and addition of the pendent epoxy groups to form a crosslink. Useful photoacid generators are thermally stable and do not undergo thermally induced reactions with the copolymer, and are readily dissolved or dispersed in the crosslinkable composition. Preferred photoacid generators are those in which the incipient acid has a pKa value of ≤0. Some common nonnucleophilic anions that may indicate the presence of an ionic photoacid generator include $SbF_6^-$, $AsF_6^-$, $PF_6^-$, $BF_4^-$, and $B(C_6F_5)_4^-$.

The adhesive generally comprising a (meth)acrylic copolymer prepared from partially polymerizing monomers to produce a syrup composition comprising the solute (meth) acrylic copolymer and free-radically polymerizable solvent monomers. The partially polymerized composition is then coated on a suitable substrate and further polymerized.

The (meth)acrylic copolymer is prepared from various monomers common to acrylic adhesives, such as a (meth) acrylic acid ester monomers (i.e. a (meth)acrylate ester monomer, also referred to as an alkyl(meth)acrylate) in combination with one or more other monomers including acid-functional ethylenically unsaturated monomers, and optionally other monomers such as non-acid-functional polar monomers and vinyl monomers.

The (meth)acrylic copolymer, as well as the unpolymerized monomers of the syrup, comprises one or more (meth) acrylate ester monomers derived from a (e.g. non-tertiary) alcohol containing from 1 to 14 carbon atoms and preferably an average of from 4 to 12 carbon atoms.

Examples of monomers suitable for use as the (meth) acrylate ester monomer include esters of either acrylic acid or methacrylic acid with a non-tertiary alcohol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable sources, such as 2-octanol, citronellol or dihydrocitronellol.

The (e.g. pressure sensitive) adhesive comprises one or more low Tg (meth)acrylic acid ester monomers, having a $T_g$ no greater than 20° C. when reacted to form a homopolymer. Suitable low Tg monomers have a $T_g$ no greater than 10° C., no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The $T_g$ of these homopolymers can be, for example, in the range of −80° C. to 20° C., −70° C. to 10° C., −60° C. to 0° C., or −60° C. to −10° C.

The low Tg alkyl acrylate monomer may have the following formula

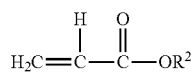

wherein $R^2$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg alkyl acrylates include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, isooctyl acrylate, isononyl acrylate, decyl acrylate, isodecyl acrylate, lauryl acrylate, isotridecyl acrylate, octadecyl acrylate, and dodecyl acrylate.

Exemplary low Tg heteroalkyl acrylates include, but are not limited to, 2-methoxyethyl acrylate and 2-ethoxyethyl acrylate.

In some embodiments, the low Tg alkyl methacrylates are alkyl methacrylates having an alkyl group with greater than 6 to 20 carbon atoms. Exemplary alkyl methacrylates include, but are not limited to, 2-ethylhexyl methacrylate, isooctyl methacrylate, n-octyl methacrylate, isodecyl methacrylate, and lauryl methacrylate. Likewise, some heteroalkyl methacrylates such as 2-ethoxy ethyl methacrylate can also be used.

In some embodiments, the (meth)acrylic copolymer as well as the unpolymerized monomers of the syrup, further comprise a high $T_g$ monomer, having a $T_g$ of at least 25° C., and preferably at least 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The $T_g$ of the copolymer may be estimated by use of the Fox equation, based on the $T_g$s of the constituent monomers and the weight percent thereof.

The (meth)acrylate ester monomers are typically present in the (meth)acrylic copolymer in an amount of at least 85, 86, 87, 88, 89, or 90 up to 95, 96, 97, 98, or 99 parts by weight, based on 100 parts by weight of the total monomer. When high $T_g$ monomers are included in a pressure sensitive adhesive, the adhesive may include at least 5, 10, 15, 20, to 30 parts by weight of such high Tg monomer(s). In some embodiments, the pressure sensitive adhesive composition comprises at least 50, 55, 60, 65, 70, 75, 80, 85, or 90 parts by weight, based on 100 parts by weight of the total monomer of one or more low Tg monomers.

The (meth)acrylic copolymer comprises repeat units derived from acid-functional ethylenically unsaturated monomer, where the acid-functional group may be an acid per se, such as a carboxylic acid, or a portion may be salt thereof, such as an alkali metal carboxylate. Useful acid-functional ethylenically unsaturated monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid (AA), methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid-functional ethylenically unsaturated monomers are generally selected from ethylenically unsaturated carboxylic acids, i.e., (meth)acrylic acids. When an even stronger acid is desired, an acid-functional ethylenically unsaturated monomer includes an ethylenically unsaturated sulfonic acid, an ethylenically unsaturated phosphonic acid, or a mixture thereof.

The acid-functional ethylenically unsaturated monomer is generally used in an amount of at least 0.5 or 1 or 2 or 3 parts by weight, based on 100 parts by weight of the total monomer content or at least 0.5 or 1 or 2, or 3 wt-% of the (meth)acrylic copolymer. The acid-functional ethylenically unsaturated monomer, or repeat units derived from such, can be present in an amount up to about 5, 6, 7, 8, 9, 10, 11, 12, 13, 14, or 15 parts by weight.

One exemplary (meth)acrylic copolymer comprising carboxylic acid functionality, is derived from copolymerizing isooctyl acrylate (IOA) and acrylic acid (AA). When the copolymer comprises (e.g. carboxylic) acid functionality in the absence of epoxy-functionality, the adhesive (e.g. syrup) further comprises an epoxy resin compound having on average greater than one polymerizable epoxy group per molecule, as will subsequently be further described.

For embodiments wherein the (meth)acrylic copolymer comprises repeat units comprising a pendent epoxy-functional group alone or in combination with repeat units comprising a pendent acid-functional group, the copolymer comprises repeat units derived from (meth)acryloyl epoxy-functional monomers.

An exemplary epoxy-functional (meth)acryloyl monomer is of the formula:

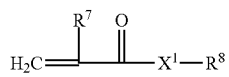

I wherein:
$R^7$ is —H or $C_1$-$C_4$ alkyl;
$X^1$ is —$NR^9$— or —O—; and
$R^8$ is an epoxy-substituted (hetero)hydrocarbyl group.

Preferably, the $R^8$ group is based on a straight-chain, branched, cyclic or polycyclic hydrocarbon of 2 to 30 carbons having an oxirane (epoxy) group included. More preferably, the $R^8$ group contains 3 or 4 to 10 carbons, such as glycidyl methacrylate (GMA), glycidyl acrylate (GA), and 4-hydroxybutyl acrylate glydiylether (4-HBAGE).

Some embodiments contain an epoxycyclohexyl group such as 3,4-epoxycyclohexylmethyl(meth)acrylate and 3-(2,3-epoxypropoxy)phenyl acrylate, 2-[4-(2,3-epoxypropoxy)phenyl]-2-(4-acryloyloxy-phenyl)propane, 4-(2,3-epoxypropoxy)cyclohexyl acrylate, 2,3-epoxycyclohexyl acrylate, and the acrylic acid monoester of poly(bisphenol-A diglycidyl ether), commercially available as Ebecryl™ 3605, from Cytec Industries, Woodland Park, N.J., and species having $R^8$ according to the formula: —[(CH$_2$)$_5$C(O)O]$_n$—CH$_2$-epoxycyclohexyl, wherein n is 0 to 10 and preferably 1-4.

In one useful embodiment, the epoxy functional monomer is derived from the reaction of vinyldimethyl azlactone with a hydroxyalkyl epoxy compound as shown as follows:

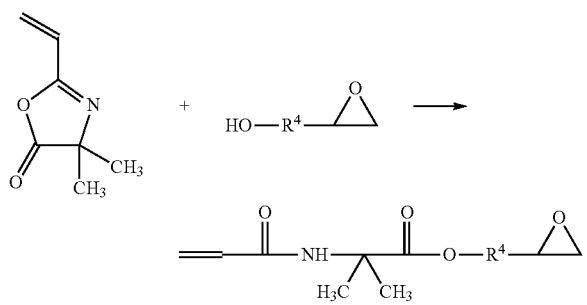

where $R^4$ is a $C_1$-$C_6$ alkylene.

Some preferred epoxy monomers are of the formula:

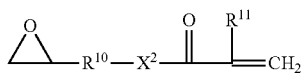

wherein:
$R^{10}$ is a (hetero)hydrocarbyl group, preferably a hydrocarbyl group;
$R^{11}$ is —H or $C_1$-$C_4$ alkyl; and
$X^2$ is —$NR^{12}$— or —O—.

One example of such epoxy monomer is oxiran-2-ylmethyl N-acryloyl-2-methylalaninate (EVDM).

When present, the epoxy-functional ethylenically unsaturated monomer is generally used in an amount of at least 0.5 or 1 part by weight, based on 100 parts by weight of the total monomer content or at least 0.5 or 1 wt-% of the (meth)acrylic copolymer. The epoxy-functional ethylenically unsaturated monomer, or repeat units derived from such, can be present in an amount up to about 5, 6, 7, 8, 9, or 10 parts by weight.

One exemplary (meth)acrylic copolymer particularly suitable for a PSA that comprises both carboxylic acid and epoxy functionality, is derived from copolymerizing isooctyl acrylate (IOA), acrylic acid (AA), and 4-hydroxylbutyl acrylate glydiylether (4-HBAGE).

Other (meth)acrylic copolymers that comprises both carboxylic acid and epoxy functionality, are derived from copolymerizing isooctyl acrylate (IOA), acrylic acid (AA), and glycidyl methacrylate (GMA) or glycidyl acrylate (GA) or oxiran-2-ylmethyl N-acryloyl-2-methylalaninate (EVDM).

The (meth)acrylic copolymer may optionally comprise other monomers such as a non-acid-functional polar monomer. As used herein, the term "polar monomer" is exclusive of an acid-functional ethylenically unsaturated monomer, and is referred to as a "non-acid-functional polar monomer."

Representative examples of a suitable non-acid-functional polar monomer includes, but is not limited, to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates and mixtures thereof. When present, preferred polar monomers include those selected from the group consisting of 2-hydroxyethyl(meth)acrylate and N-vinylpyrrolidinone.

A non-acid-functional polar monomer may be used in an amount of 0 to 10 parts by weight, based on 100 parts by weight of the total monomer. In certain embodiments, such monomer is used in an amount of at least 0.5 parts and no greater than 5 parts by weight of the total monomer or at least 0.5 or no greater than 5 wt-% of the (meth)acrylic copolymer.

When used, vinyl monomers useful in the (meth)acrylic copolymer include a styrene, substituted styrene (e.g., α-methyl styrene), vinyl halide, and mixtures thereof. As used herein, the term "vinyl monomer" is exclusive of an acid-functional ethylenically unsaturated monomer, an acrylate ester monomer, and a polar monomer.

A vinyl monomer may be used in an amount of 0 to 5 parts by weight, based on 100 parts by weight of the total. In certain embodiments, such monomer is used in an amount of at least 1 part by weight of the 100 parts of the total monomer and no greater than 5 parts by weight of the total monomer or at least 1 or no greater than 5 wt-% of the (meth)acrylic copolymer In some embodiments, the copolymer contains no allyl ether, vinyl ether or vinyl ester monomer units.

In order to increase cohesive strength of the coated adhesive composition, a multifunctional (meth)acrylate monomer may be incorporated into the blend of polymerizable monomers to assist in crosslinking. Such compounds are often referred to as chemical crosslinking agents. A multifunctional (meth)acrylate is particularly useful for syrup polymerization. Examples of useful multifunctional (meth)acrylates include, but are not limited to, di(meth)acrylates, tri(meth)acrylates, and tetra(meth)acrylates, such as 1,6-hexanediol di(meth)acrylate (HDDA), poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

Generally the multifunctional (meth)acrylate is not part of the original monomer mixture, but added subsequently to the copolymerization of the other monomers. If used, typically, a multifunctional (meth)acrylate is used in an amount of at least 0.01, 0.02, 0.03, 0.04, or 0.05 up to 1, 2, 3, 4, or 5 parts by weight, relative to 100 parts by weight of the total monomer content. In some embodiments, the (e.g. pressure sensitive) adhesive comprises predominantly (greater than 50%, 60%, 70%, 80%, or 90% of the total crosslinks) or exclusively crosslinks of an epoxy group with a (e.g. carboxylic) acid group.

In some embodiments, the (meth)acrylic copolymer described herein comprises a combination of repeat units comprising pendent (e.g. carboxylic) acid-functional groups and repeat units comprising pendent epoxy-functional groups. It has been found that when the (meth)acrylic copolymer comprises both (e.g. carboxylic) acid and epoxy functional groups, the copolymer can surprisingly spontaneously crosslink, in the absence of an ionic photoacid generator. Such reaction scheme, contrasted to the reaction scheme including an ionic photoacid generator, is as follows:

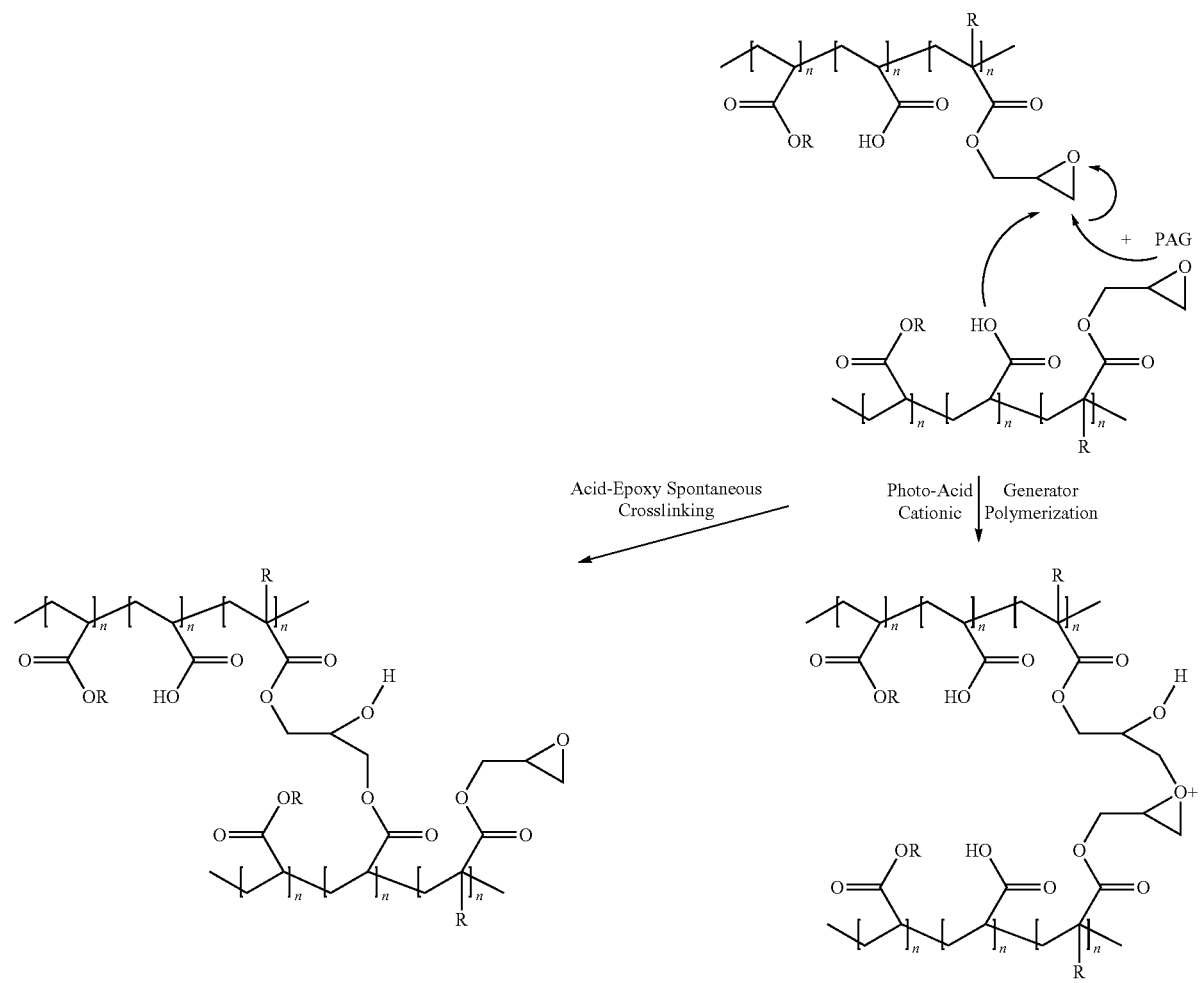

The (e.g. solute) (meth)acrylic copolymer comprising a combination of repeat units comprising pendent (e.g. carboxylic) acid-functional groups and repeat units comprising pendent epoxy-functional groups can be formed by various methods. In a typical method, the (e.g. solute) (meth)acrylic copolymer is prepared by copolymerizing the alkyl(meth)acrylate monomer, the ethylenically unsaturated monomer comprising an acid-functional group; and the monomer comprising an epoxy-functional group. Alternatively, the (e.g. solute) (meth)acrylic copolymer can be prepared by copolymerizing the alkyl(meth)acrylate monomer and the ethylenically unsaturated monomer comprising an acid-functional group, such as IOA/AA. A monomer comprising an epoxy-functional group, as previously described, is added to the (e.g. IOA/AA) copolymer prior to radiation curing. Likewise, is another embodiment, the solute (meth)acrylic copolymer is prepared by copolymerizing the alkyl(meth) acrylate monomer and the monomer comprising an epoxy-functional group, such as IOA/4-HBAGE. An ethylenically unsaturated monomer comprising an acid-functional group, as previously described, is added to the (e.g. IOA/4-HBAGE) copolymer prior to radiation curing. During curing a (meth)acrylic copolymer having both pendent acid-functional groups and pendent epoxy-groups is formed.

A more detailed explanation of the reaction scheme when an ionic photoacid generator is present is described in previously cited WO 2012/177337. In the absence of an ionic photoacid generator, the acid group directly ring opens the epoxy group forming a crosslink, in the absence of forming an oxonium functional copolymer as an intermediate.

In yet another embodiment, the (meth)acrylic copolymer comprises pendent (e.g. carboxylic) acid functionality, the (e.g. carboxylic) acid groups and the acid groups are cross-linked with certain epoxy crosslinking compounds in the absence of an ionic photoacid generator, as depicted by the following reaction scheme:

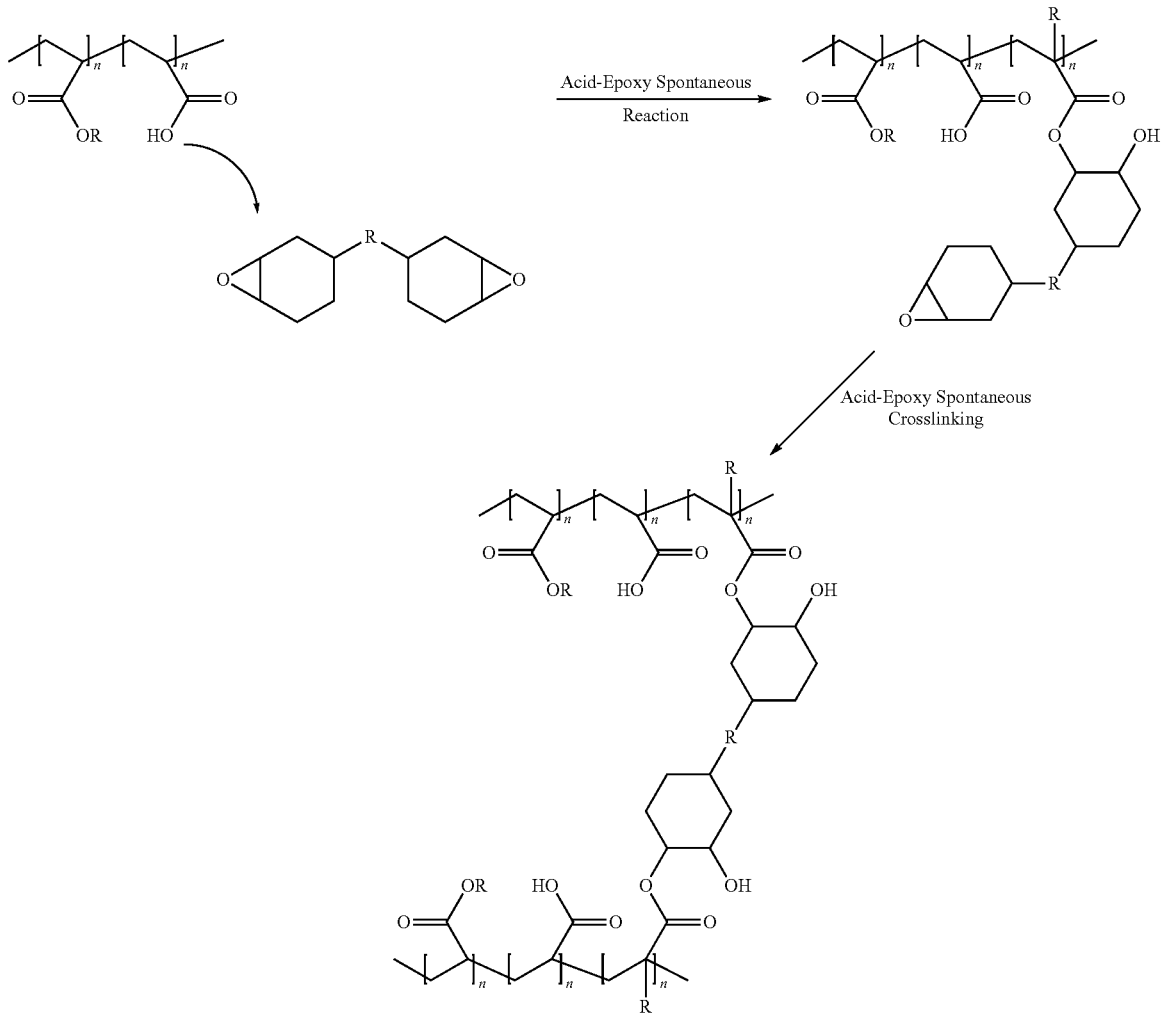

Epoxy resins suitable for use as an epoxy crosslinking compound include monomeric or oligomeric epoxy compounds that can be aliphatic, alicyclic, aromatic, or heterocyclic. These materials generally have, on the average, greater than 1 polymerizable epoxy group per molecule. In some embodiments, the epoxy resins have 1.5 or 2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendent epoxy groups (for example, a glycidyl methacrylate oligomer or co-oligomer). The epoxides can be pure compounds or can be mixtures of compounds containing one, two, or more epoxy groups per molecule. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

In some embodiments, the epoxy crosslinking compound has the formula:

$R^1\text{—}[R^2R^3]_m$ wherein
wherein R' is a (hetero)hydrocarbyl radical,
$R^2$ is a divalent (e.g. C1-C4) alkylene group,
and $R^3$ is a cycloaliphatic epoxy group, and
m averages greater than 1, or 1.5, or 2.

$R^1$ is a multi-valent radical comprising an aliphatic group, aromatic group, or combination thereof. The average number of (e.g. terminal) cycloaliphatic epoxy groups (i.e. m) can range up to 6, but is typically no greater than 3 or 2.

Suitable commercially available epoxy resins include 3,4-epoxycyclohexylmethyl-3,4-epoxycyclohexene carboxylate (for example, ERL 4221, CYRACURE UVR 6110, and CYRACURE UVR 6105 from Union Carbide), 3,4-epoxy-6-methylcyclohexylmethyl-3,4-epoxy-6-methyl-cyclohexene carboxylate (for example, ERL 4201 from Union Carbide), bis(3,4-epoxy-6-methylcyclohexylmethyl) adipate (for example, ERL 4289), bis(2,3-epoxycyclopentyl) ether (for example, ERL 0400), bis(3,4-epoxycyclohexylmethyl) adipate (for example, ERL 4299 or CYRACURE UVR 6128), 2-(3,4-epoxycyclohexyl-5,5-spiro-3,4-epoxy)cyclohexane-meta-dioxane (for example, ERL-4234), and vinyl-cyclohexene monoxide.

Other useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099 (Proops et al).

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively or additionally, the epoxy resin can contain a blend of epoxy-containing materials having different chemical natures such as aliphatic and aromatic or different functionalities such as polar and non-polar. Other cationically-reactive polymers (such as vinyl ethers and the like) can additionally be incorporated, if desired.

In some embodiments, the adhesive composition contains at least 0.1, 0.2, 0.3, 0.4, or 0.5 wt-% of epoxy crosslinker resin and typically no greater than 10 wt-%. In some embodiments, the adhesive composition comprises no greater than 9, 8, 7, 6, or 5 wt-% of epoxy crosslinker. Typically the minimum amount of epoxy crosslinker is utilized that will provide the desired increase in shear strength. In some embodiments, the epoxy crosslinker is present in the adhesive composition at a concentration no greater than 4, 3, 2, or 1 wt-%. One method of preparing (meth)acrylic copolymers having epoxy-functionality, acid-functionality, or a combination thereof includes partially polymerizing monomers to produce a syrup composition comprising the solute (meth)acrylic copolymer and unpolymerized solvent monomers. Partial polymerization provides a coatable solution of the (meth)acrylic solute polymer in one or more free-radically polymerizable solvent monomers.

It will be understood that a syrup polymerization method will produce a "dead polymer" in the initial free radical polymerization; i.e. a fully polymerized, not free-radically polymerizable polymer. Subsequently the solvent monomers do not free-radically polymerize onto the extant solute copolymer.

The syrup method provides advantages over solvent or solution polymerization methods; the syrup method yielding higher molecular weights. These higher molecular weights increase the amount of chain entanglements, thus increasing cohesive strength. Also, the distance between cross-links can be greater with high molecular syrup polymer, which allows for increased wet-out onto a surface.

Herein a crosslinkable composition is provided that includes a solute polymer comprising a plurality of polymerized monomer units comprising pendent epoxy (or oxirane) units and/or pendent acid units in a solvent monomer (e.g. comprising the same monomers utilized to prepare the solute polymer.)

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of no more than 3.0 parts by weight, preferably no more than 1.0 part by weight, and more preferably no more than 0.5 part by weight, relative to 100 parts by weight of the total monomer content.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime.

Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup composition. Such polymerizable photoinitiators are described, for example, in U.S. Pat. Nos. 5,902,836 and 5,506,279 (Gaddam et al.).

The syrup composition and the photoinitiator may be irradiated with activating UV radiation to polymerize the monomer component(s). UV light sources can be of two types: 1) relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$. Such photoinitiators preferably are present in an amount of from 0.1 to 1.0 part by weight, relative to 100 parts by weight of the total monomer content that would form an unmodified acid-functional (meth)acrylic copolymer. Accordingly, relatively thick coatings can be achieved when the extinction coefficient of the photoinitiator is low.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000, preferably at least 500,000.

When preparing (meth)acrylic copolymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

It is preferable to coat the adhesive composition soon after preparation. The adhesive polymer composition (containing the copolymer having both epoxy and acid functionality or a copolymer having acid functionality and epoxy crosslinking agent, and unpolymerized monomer(s)), as a syrup, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

The (e.g. pressure-sensitive) adhesive composition may also contain one or more conventional additives. Preferred additives include tackifiers, plasticizers, fillers (e.g. glass bubbles, fumed silica), dyes, antioxidants, and UV stabilizers.

If tackifiers are used, then up to 50% by weight, preferably less than 30% by weight, and more preferably less than 5% by weight, based on the dry weight of the total adhesive polymer would be suitable. In some embodiments no tackifier is used. Suitable tackifiers for use with (meth)acrylate polymer dispersions include a rosin acid, a rosin ester, a terpene phenolic resin, a hydrocarbon resin, and a cumarone indene resin. The type and amount of tackifier can affect properties such as contactability, bonding range, bond strength, heat resistance and specific adhesion. Adhesive articles may be prepared by coating the adhesive composition of a suitable support, such as a flexible and inflexible backing materials using conventional coating techniques to produce adhesive-coated materials. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like.

Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly (ethylene) and poly(propylene), such as TYVEK and TYPAR (available from DuPont, Inc.); and porous films obtained from poly(ethylene) and poly(propylene), such as TESLIN (available from PPG Industries, Inc.), and CELL-GUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying.

The flexible support may also include a release-coated substrate. Such substrates are typically employed when an adhesive transfer tape is provided. Examples of release-coated substrates are well known in the art and include, by way of example, silicone-coated Kraft paper, and the like. Tapes of the disclosure may also incorporate a low adhesion backing (LAB), which are known in the art.

EXAMPLES

Objects and advantages of this disclosure are further illustrated by the following examples, but the particular materials and amounts thereof recited in these examples, as well as other conditions and details, should not be construed to unduly limit this disclosure.

As used herein, "pph" refers to parts per one hundred parts of the monomers of the epoxy-functional (meth)acrylic copolymer.

Test Methods
Peel Adhesion Test [ASTM D 3330/D 3330M-04]

The test measures the force required to peel the tape from glass at an angle of 180 degrees. The test was performed on conditioned tapes prepared in the examples using the procedure described in the referenced ASTM Test Methods. The adhesive formulation to be tested was coated onto Mitsubishi Hostaphan™ primed polyester film. A test sample was prepared by adhering a 12.7-millimeter (12.7-mm) wide tape to a glass plate and rolling over the tape twice with 2-kilogram (2-kg) roller. Prior to peel testing, tapes were conditioned for 7 days in a controlled environment room (23° C./50% relative humidity. The tape was tested on a tensile force tester at a platen speed of 12 inches/minute (305 millimeter/minute (mm/min)). The data reported was as an arithmetic average of two measurements. The averaged values were expressed in Newtons per decimeter (N/dm).

Shear Strength Test [ASTM D-3654/D 3654M 06]

The test measures the static shear strength of an adhesive tape in at elevated temperature (70° C.) from when one end of the tape is adhered to a stainless steel plate, suspended vertically, and a weight is attached to the free end of the tape. Prior to shear testing, tapes were conditioned for the duration of time specified (e.g. 7 days) in a controlled environment room (23° C./50% relative humidity).

70° C. Shear:

A test sample was prepared from the conditioned tapes prepared in the examples. A 12.7-mm wide by 25.4-mm long tape was adhered to one edge of a stainless steel plate so that it overlapped the panel by 12.7 mm, and a 2-kg roller was rolled twice over the portion of tape adhered to the panel. A 0.5-kg weight was attached to the free end of the tape, and the panel was suspended vertically in an oven set at 70° C. The time, in minutes, for the tape to fall from the panel was measured and the time to failure and the mode of failure was recorded. The failure mode can be adhesive (a) in which the adhesive pulls away cleanly from the panel or the tape backing or cohesive (c) in which the adhesive splits and part of the adhesive is left on the tape and part is left on the tape backing. The test was terminated if failure had not occurred in 10,000 minutes and the results recorded. The data reported was as an arithmetic average of three measurements.

Raw materials used for these examples are described as follows:
Abbreviation/Chemical Description
IOA—Isooctyl acrylate
AA—Acrylic acid
GA—Glycidyl acrylate
GMA—Glycidyl methacrylate
4HBAGE—4-hydroxybutyl acrylate glycidylether
EVDM—oxiran-2-ylmethyl N-acryloyl-2-methylalaninate
HDDA—1,6 hexanediol diacrylate
ERL-4221—3,4 Epoxy cyclohexyl methyl 3,4 epoxy cyclohexyl carboxylate epoxy resin (DOW Chemical Co., Midland Mich., USA)
Irgacure 651—2,2-dimethoxy-2-phenylacetophenone Preparation of oxiran-2-ylmethyl
N-acryloyl-2-methylalaninate (EVDM)

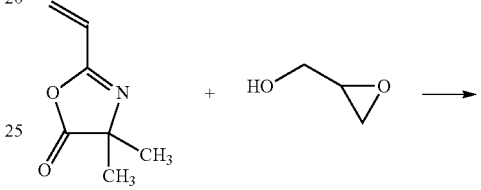

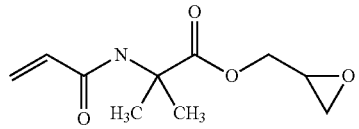

To a 4 ounce glass jar were added vinyldimethyl azlactone (17.1 g, 0.12 mol, available from 3M), freshly distilled glycidol (9.1 g, 0.12 mol, available from Acros) and 2 drops of 1,8-diazabicyclo[5.4.0]undec-7-ene (DBU, available from Aldrich). The mildly exothermic reaction was moderated by cooling the reaction vessel in an ice bath for a few minutes, then the reaction mixture was allowed to stand at room temperature overnight. The solid white reaction product was recrystallized from a mixture of diethyl ether and cyclohexane. The resulting crystals were filtered off, washed with 50 mL of cyclohexane, and dried to provide the desired product (20.4 g). NMR and IR spectral analyses confirmed the structure of the product.

Example 1

Preparation of Syrup Containing (Meth)Acrylic Copolymer with Pendent Acid and Pendent Epoxy Groups A one quart jar was charged with 89 g of isooctyl acrylate (IOA, 89 parts), 10 g of acrylic acid (AA, 10 parts), 1 g of 4-hydroxybutyl acrylate glycidylether, (4HBAGE, 1 parts), and 0.04 g of 2,2-dimethoxy-2-phenylacetophenone photoinitiator (Irgacure™ 651 (Irg 651), Ciba Specialty Chemicals Inc, 0.04 phr). The monomer mixture was purged with nitrogen for 5 minutes then exposed to low intensity ultraviolet radiation until a coatable syrup copolymer was prepared.

Coating and Curing

The syrup was blended additional Irgacure™ 651 (0.16 phr) coated on Mitsubishi Hostaphan™ primed polyester film at a 2 mil (~50 micrometers) thickness and cured by UVA light (550 mJ/cm$^2$).

Examples 2-3 and 5-8 were prepared, coated and cured in the same manner as Example 1 utilizing the concentrations of component described in Tables 1 and 2.

Example 4

Preparation of the Syrup Containing Copolymer with Pendent Acid Groups and Cycloaliphatic Epoxy Resin Crosslinker A one quart jar was charged with 20 g of IOA/AA syrup (100 parts) and 0.2 g of 3,4 epoxy cyclohexyl methyl 3,4 epoxy cyclohexyl carboxylateacrylic acid (1 parts). The mixture was jar rolled for 24 hours, then coated on Mitsubishi Hostaphan™ primed polyester film at a 2 mil (~50 micrometers) thickness and cured by UVA light (550 mJ/cm$^2$).

Coating and Curing

The syrup was blended additional Irgacure™ 651 (0.16 phr), coated and cured in the same manner as previously described.

TABLE 1

| | IOA (wt %) | AA (wt %) | 4HBAGE (wt %) | ERL-4221 (phr) | Shear (70° C.) after 0 days | Shear (70° C.) after 1 days | Shear (70° C.) after 3 days | Shear (70° C.) after 7 days | Peel (0.305 m/min) (N/dm) |
|---|---|---|---|---|---|---|---|---|---|
| Example 1 | 89 | 10 | 1 | 0 | 188 | 10000 | 10000 | 10000 | 78 |
| Example 2 | 94 | 5 | 1 | 0 | 1$^c$ | 83$^c$ | 10000 | 10000 | 50 |
| Example 3 | 97 | 2 | 1 | 0 | 0$^c$ | 1$^c$ | 1$^c$ | 44$^c$ | 117$^\#$ |
| Example 4 | 90 | 10 | 0 | 1 | 10000 | 10000 | 10000 | 10000 | 47 |
| Example 5 | 90 | 10 | 0.16 | 0 | 4890$^c$ | 2800$^c$ | 1430$^c$ | 2380$^c$ | 44 |

$^c$stands for cohesive mode of failure.
$^\#$stand for adhesive residual left behind on substrate.

TABLE 2

| | IOA (wt %) | AA (wt %) | GA (phr) | GMA (phr) | EVDM (phr) | Shear (70° C.) after 7 days | Peel (0.305 m/min) (N/dm) |
|---|---|---|---|---|---|---|---|
| Example 6 | 90 | 10 | 0.5 | 0 | 0 | 10000 | 6 |
| Example 7 | 90 | 10 | 0 | 0.5 | 0 | 10000 | 7 |
| Example 8 | 90 | 10 | 0 | 0 | 0.5 | 10000 | 8 |

Examples 9-10

Preparation of the Syrup Containing Copolymer with Pendent Acid Groups and Epoxy Monomer Crosslinker A 30 dram vial was charged with 18 g of isooctyl acrylate (IOA, 90 parts), 2 g of acrylic acid (AA, 10 parts), and 0.008 g of 2,2-dimethoxy-2-phenylacetophenone photoinitiator (Irgacure™ 651 (Irg651), Ciba Specialty Chemicals Inc, 0.04 phr). The monomer mixture was mixed, purged with nitrogen for 5 minutes, then exposed to low intensity ultraviolet radiation until a coatable syrup was prepared.

The pre-adhesive polymer syrup was blended with additional 0.032 g (0.16 phr) of the Irgacure™ 651 and 0.2 g (1 phr) or 5 phr of 4-hydroxybutyl acrylate glycidylether and mixed for 24 hrs.

Examples 11-12

Preparation of the Syrup Containing Copolymer with Pendent Epoxy Groups and Acid Crosslinker The formulations of Examples 9-12 were then coated on Mitsubishi Hostaphan™ primed polyester film at a 2 mil (~50 micrometers) thickness for the syrup pre-adhesive formulations and cured by UVA light (550 mJ/cm$^2$).

TABLE 3

| | IOA (wt %) | AA (wt %) | 4HBAGE (wt %) | AA (phr) | 4HBAGE (phr) | Shear (70° C.) after 7 days | Peel (0.305 m/min) (N/dm) |
|---|---|---|---|---|---|---|---|
| Example 9 161593-106-1 | 90 | 10 | 0 | 0 | 1 | 10000 | 56 |
| Example 10 161593-106-2 | 90 | 10 | 0 | 0 | 5 | 10000 | 37 |
| Example 11 161593-106-3 | 90 | 0 | 10 | 1 | 0 | 10000 | 7 |
| Example 12 161593-106-4 | 90 | 0 | 10 | 5 | 0 | 10000 | 3 |

The peel adhesion of Examples 6-8 and 11-12 can be increased by use of a tackifier.

What is claimed is:

1. A method of preparing an adhesive composition comprising:
   a) providing a syrup composition comprising
      i) a free-radically polymerizable solvent monomer;
      ii) a solute (meth)acrylic copolymer comprising repeat units derived from
         at least one alkyl(meth)acrylate monomer, and
         at least one ethylenically unsaturated monomer comprising an acid-functional group;
         optionally at least one (meth)acryloyl monomer comprising an epoxy-functional group
      iii) an epoxy resin having on average greater than one polymerizable epoxy group per molecule; and
   b) radiation curing the syrup composition in the absence of an ionic photoacid generator and multifunctional (meth)acrylate monomer such that the epoxy resin crosslinks the acid-functional groups.

2. The method of claim 1 wherein the syrup comprises 0.1 to 10 wt-% of ethylenically unsaturated monomer(s) comprising an acid-functional group.

3. The method of claim 1 wherein the acid-functional group is a carboxylic acid group.

4. The method of claim 1 wherein the ethylenically unsaturated monomer comprising an acid-functional group is acrylic acid or (meth)acrylic acid.

5. The method of claim 1 wherein the (meth)acrylic copolymer comprises 0.1 to 5 wt-% of (meth)acryloyl monomer comprising an epoxy-functional group.

6. The method of claim 1 wherein the (meth)acryloyl monomer comprising an epoxy-functional group is of the formula:

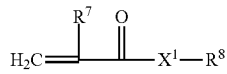

wherein:
$R^7$ is —H or $C_1$-$C_4$ alkyl;
$X^1$ is —$NR^9$— or —O—; and
$R^8$ is an epoxy-substituted (hetero)hydrocarbyl group.

7. The method of claim 1 wherein the (meth)acryloyl monomer comprising an epoxy-functional group is of the formula:

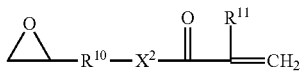

wherein:
$R^{10}$ is a (hetero)hydrocarbyl group, preferably a hydrocarbyl group;

$R^{11}$ is —H or $C_1$-$C_4$ alkyl; and
$X^2$ is —$NR^{12}$— or —O—.

8. The method of claim 1 wherein the syrup comprises at least 50 wt-% of (meth)acrylic acid ester monomers having a Tg less than 0° C.

9. The method of claim 1 wherein the adhesive is a pressure sensitive adhesive.

10. The method of claim 1 wherein the syrup comprises a photoinitiator.

11. The method of claim 1 wherein the solute (meth)acrylic copolymer is prepared by copolymerizing the alkyl (meth)acrylate monomer, the ethylenically unsaturated monomer comprising an acid-functional group; and the monomer comprising an epoxy-functional group.

12. The method of claim 1 wherein the solute (meth)acrylic copolymer is prepared by copolymerizing the alkyl (meth)acrylate monomer and the ethylenically unsaturated monomer comprising an acid-functional group; and the monomer comprising an epoxy-functional group is added prior to radiation curing.

13. The method of claim 1 wherein the solute (meth)acrylic copolymer is prepared by copolymerizing the alkyl (meth)acrylate monomer and the monomer comprising an epoxy-functional group; and the ethylenically unsaturated monomer comprising an acid-functional group is added prior to radiation curing.

14. The method of claim 1 wherein the radiation curing comprises exposing the syrup to ultraviolet radiation.

15. The method of claim 1 wherein the syrup is applied to a substrate prior to radiation curing.

16. The method of claim 1 wherein the adhesive composition comprises 0.5 to 3 wt-% of epoxy resin.

17. The method of claim 1 wherein the acid-functional group of the solute (meth)acrylic copolymer directly ring opens the epoxy group forming a crosslink.

* * * * *